US009194358B1

(12) United States Patent
Avramidis

(10) Patent No.: US 9,194,358 B1
(45) Date of Patent: Nov. 24, 2015

(54) AUTOMOTIVE CARBON MONOXIDE SENSOR

(71) Applicant: Dimitrios Avramidis, Brighton, MA (US)

(72) Inventor: Dimitrios Avramidis, Brighton, MA (US)

(*) Notice: Subject to any disclaimer, the term of this patent is extended or adjusted under 35 U.S.C. 154(b) by 0 days.

(21) Appl. No.: 14/590,646

(22) Filed: Jan. 6, 2015

(51) Int. Cl.

| | |
|---|---|
| ***B60R 22/00*** | (2006.01) |
| ***E05F 15/00*** | (2015.01) |
| ***G05D 1/00*** | (2006.01) |
| ***G05D 3/00*** | (2006.01) |
| ***G06F 7/00*** | (2006.01) |
| ***G06F 17/00*** | (2006.01) |
| ***F02N 11/10*** | (2006.01) |
| ***F02N 11/08*** | (2006.01) |
| ***G08B 21/14*** | (2006.01) |

(52) U.S. Cl.
CPC .............. *F02N 11/101* (2013.01); *F02N 11/08* (2013.01); *G08B 21/14* (2013.01)

(58) Field of Classification Search
CPC .. B60N 2/0248; B60N 2/0244; B60N 2/0232; B60N 2/0252; B60Q 2300/112
USPC ........................................................ 701/49, 1
See application file for complete search history.

(56) References Cited

U.S. PATENT DOCUMENTS

| | | | |
|---|---|---|---|
| D350,300 | S | 9/1994 | Browning |
| 6,208,256 | B1 | 3/2001 | Fleming |
| 6,448,888 | B1 | 9/2002 | Hormer |
| 6,672,954 | B2 | 1/2004 | Shtanko |
| 6,998,991 | B1 | 2/2006 | Goldstein |
| 8,375,913 | B2 | 2/2013 | Kwiecinski |
| 2007/0032918 | A1 | 2/2007 | Chang |
| 2009/0005917 | A1 | 1/2009 | Hole |
| 2014/0074383 | A1 | 3/2014 | Frey |

*Primary Examiner* — Maceeh Anwari

(57) ABSTRACT

The automotive carbon monoxide sensor includes a sensor housing that is adapted to be secured to a ceiling surface of a vehicle. The sensor housing includes a motion sensor, a heat sensor, and a carbon monoxide sensor. The sensor housing is in wired connection with a seat belt sensor and a weight sensor that are located in or around a driver seat of said vehicle. The seat belt sensor, the weight sensor, the motion sensor, the heat sensor, and the carbon monoxide sensor detect all collectively work to monitor a plurality of parameters that may involve the use of an audible alarm being sounded via a vehicle horn. A first wire is adapted to connect to a vehicle battery. The wire connects to the weight sensor. A second wire connects to the weight sensor to the vehicle horn.

8 Claims, 4 Drawing Sheets

CO and Heat Alert System

AUTOMOTIVE CARBON MONOXIDE SENSOR

CROSS REFERENCES TO RELATED APPLICATIONS

Not Applicable.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of automotive accessories, more specifically, a carbon monoxide sensor that works to detect carbon monoxide within a vehicle.

SUMMARY OF THE INVENTION

The automotive carbon monoxide sensor includes a sensor housing that is adapted to be secured to a ceiling surface of a vehicle. The sensor housing includes a motion sensor, a heat sensor, and a carbon monoxide sensor. The sensor housing is in wired connection with a seat belt sensor and a weight sensor that are located in or around a driver seat of said vehicle. The seat belt sensor, the weight sensor, the motion sensor, the heat sensor, and the carbon monoxide sensor detect all collectively work to monitor a plurality of parameters that may involve the use of an audible alarm being sounded via a vehicle horn. A connects to the weight sensor. A second wire connects to the weight sensor, and is adapted to connect to a vehicle horn in order to power the vehicle horn in an emergency.

These together with additional objects, features and advantages of the automotive carbon monoxide sensor will be readily apparent to those of ordinary skill in the art upon reading the following detailed description of presently preferred, but nonetheless illustrative, embodiments of the automotive carbon monoxide sensor when taken in conjunction with the accompanying drawings.

In this respect, before explaining the current embodiments of the automotive carbon monoxide sensor in detail, it is to be understood that the automotive carbon monoxide sensor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automotive carbon monoxide sensor.

It is therefore important that the claims be regarded as including such equivalent construction insofar as they do not depart from the spirit and scope of the automotive carbon monoxide sensor. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

Figure 1:
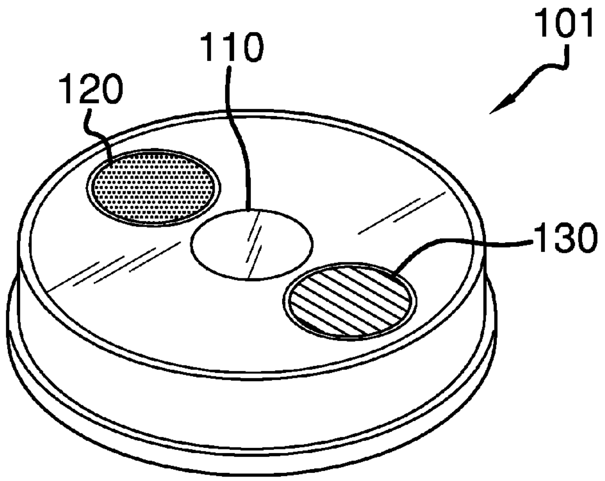
FIG. 1 is a perspective view of the sensor housing of an embodiment of the disclosure.
Figure 2:
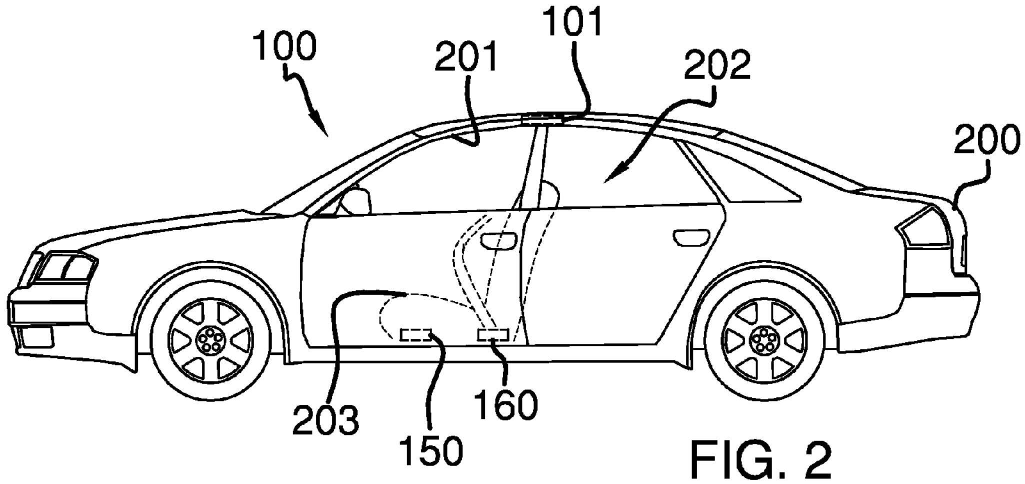
FIG. 2 is a side view of an embodiment of the disclosure in use with a vehicle.
Figure 3:
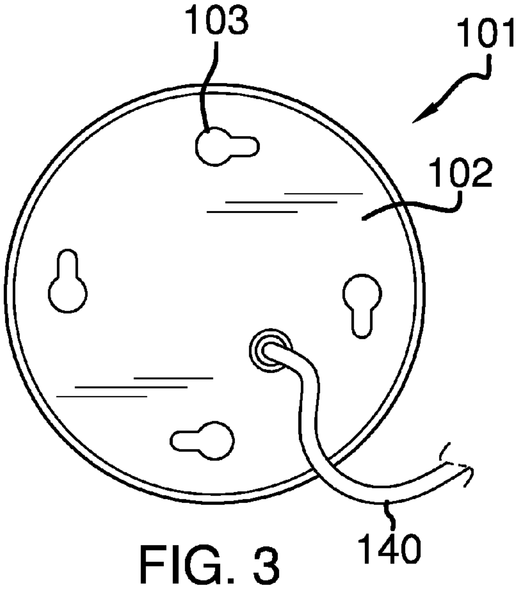
FIG. 3 is a back view of the sensor housing of an embodiment of the disclosure.
Figure 4:
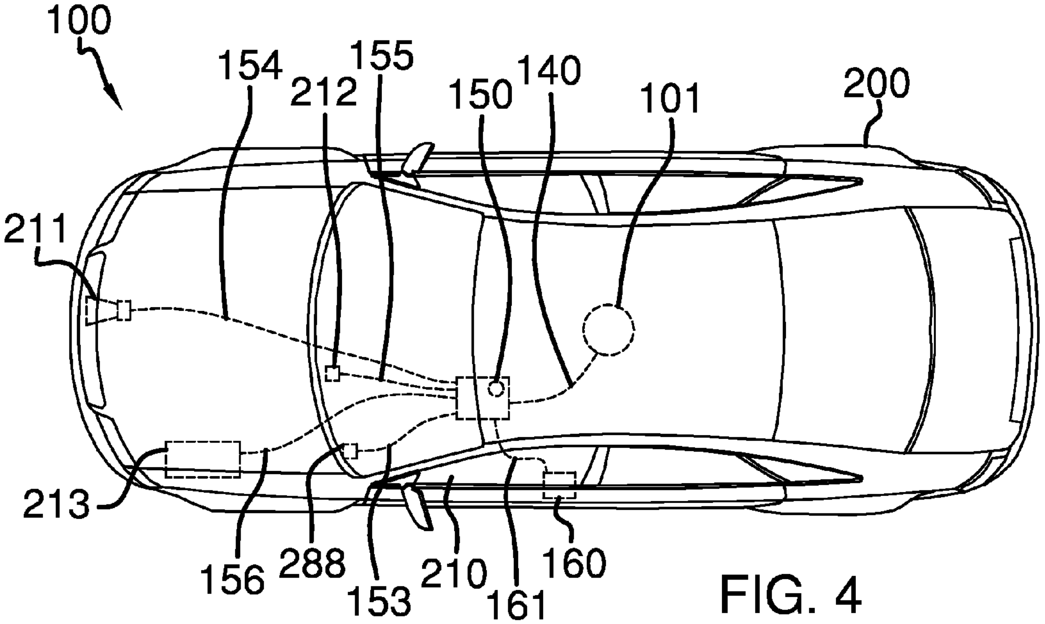
FIG. 4 is a top view of an embodiment of the disclosure in use with a vehicle.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 6, the automotive carbon monoxide sensor 100 (hereinafter invention) generally comprises a sensor housing 101 that is adapted to be secured to a ceiling surface 201 of a vehicle 200. The sensor housing 101 is further defined with a top housing surface 102 that includes at least one mounting hole 103 thereon so that the sensor housing 101 is adapted to be mounted to the ceiling surface 201 of the vehicle 200.

The sensor housing 101 includes a motion sensor 110, a heat sensor 120, and a carbon monoxide sensor 130. The motion sensor 110, the heat sensor 120, and the carbon monoxide sensor 130 are each used to detect motion, heat, and carbon monoxide from within a passenger compartment 202 of the vehicle 200.

The sensor housing 101 includes a sensor housing wire 140 that extends from the sensor housing 101 to a central processing unit 199. The weight sensor 150 is adapted to be mounted under a driver seat 203 of the vehicle 200. The weight sensor 150 is responsible for detecting whether a driver 500 is present inside of the vehicle 200. The central processing unit 199 is wired to a seat belt sensor 160 via a seat belt wire 161. The seat belt sensor 160 is used to detect whether or not a driver seat belt 204 is in use. The seat belt sensor 160 is adapted to detect a position of the driver seal belt 204.

The central processing unit 199 is adjacent to the weight sensor 150. The central processing unit 199 is in wired connection with the weight sensor 150, and the sensor housing wire 140. Moreover, the central processing unit 199 includes a window relay wire 153, a vehicle horn wire 154, a vehicle ignition kill wire 155, and a cellular transceiver wire 177. The window relay wire 153 extends from the central processing unit 199 over to a window relay 288 in order to automatically lower at least one vehicle window 210. The vehicle horn wire 154 is adapted to connect the central processing unit 199 to a vehicle horn 211. The vehicle ignition kill wire 155 is adapted to connect the central processing unit 199 to a vehicle ignition switch 212. The central processing unit 199 also includes a power wire 156 that is adapted to connect to a vehicle battery 213. The cellular transceiver wire 177 is adapted to communicate with a cell phone via a cellular transceiver 178.

Figure 5:
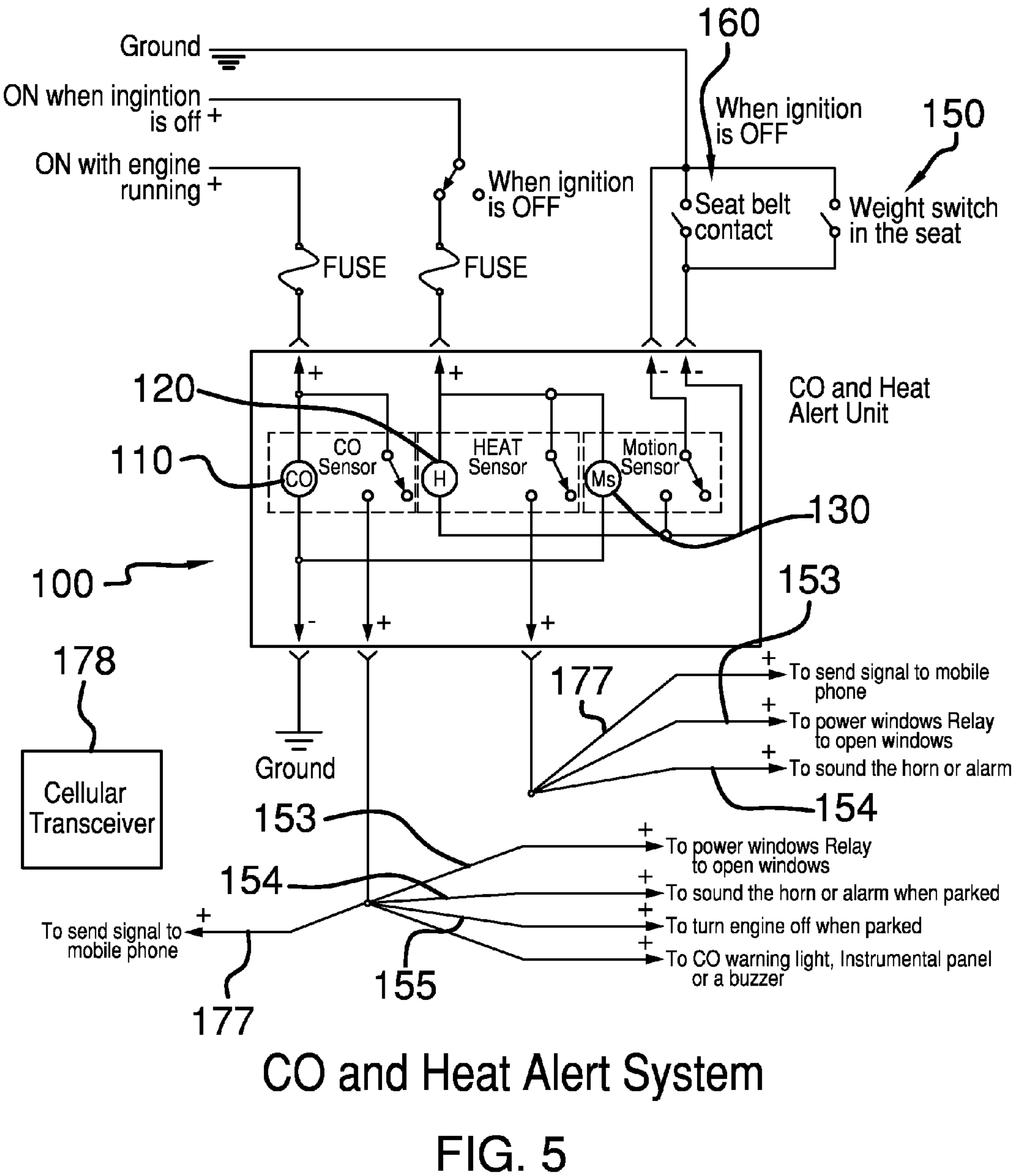
FIG. 5 is a view of a wiring diagram of an embodiment of the disclosure.
Figure 6:
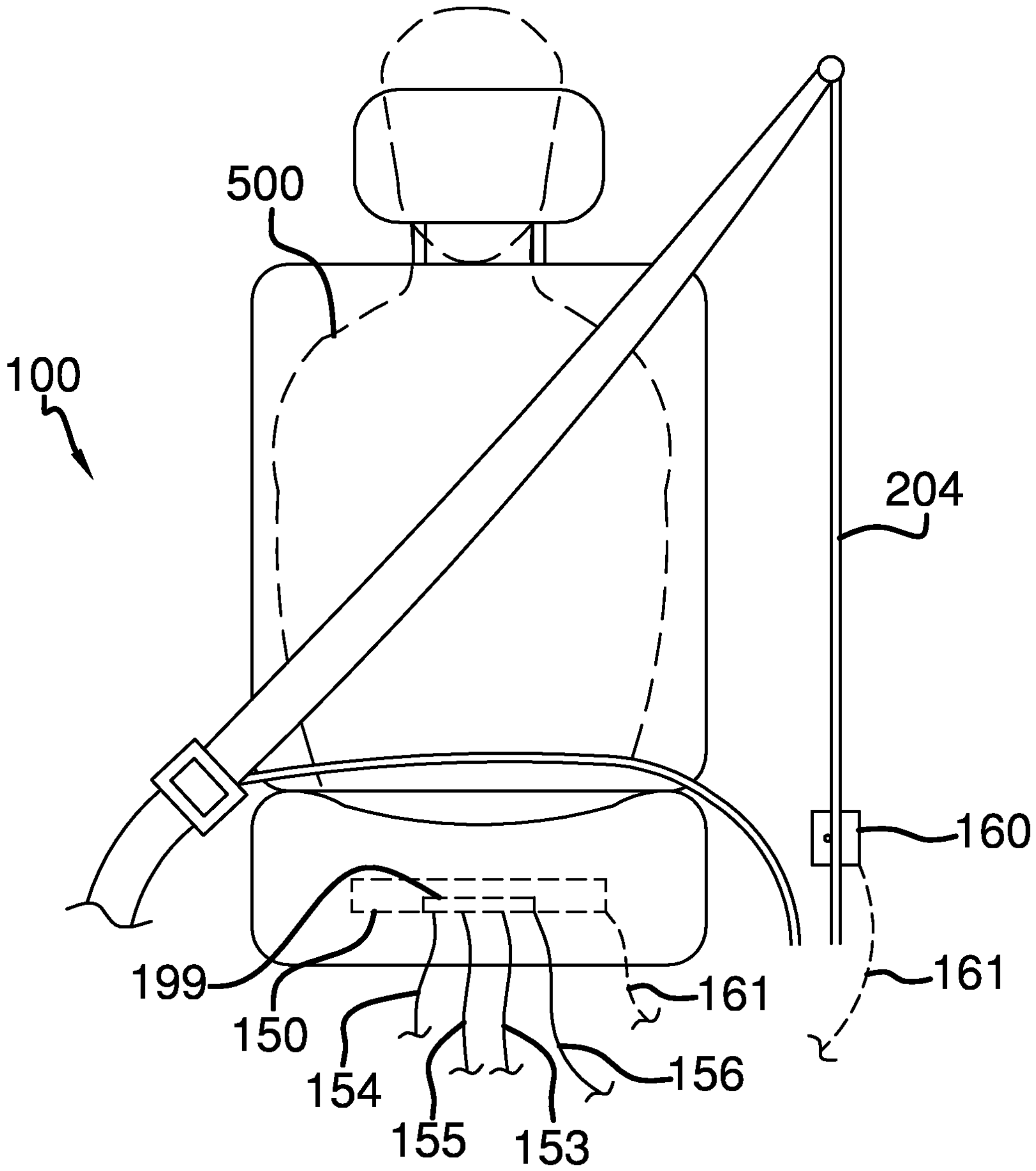
FIG. 6 is a detailed view of an embodiment of the disclosure in use with a driver seat.

Referring to FIG. 5, the invention 100 utilizes a wiring diagram that enables a programmable logic controller to operate a majority of the sensors utilized in the invention 100. The invention 100 is used to monitor whether the vehicle driver seat 203 has the driver 500 seated therein, and whether the vehicle is idling. Moreover, the sensor housing 101 includes the motion sensor 110, the heat sensor 120, and the carbon monoxide sensor 130 in order to detect the presence of individuals aside of the driver 500 in the vehicle 200, the temperature inside of the vehicle, and carbon monoxide levels inside of the vehicle 200, respectively.

Upon detection of (1) an occupant inside of the vehicle, and without the driver 500, (2) temperature inside of the vehicle 200 above a pre-defined parameter and/or (3) carbon monoxide level inside of the vehicle 200 above a pre-defined parameter, the invention 100 will issue an alarm via the vehicle horn 211 and simultaneously roll down at least one vehicle window 210.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An automotive carbon monoxide sensor comprising:

a sensor housing that includes a motion sensor, a heat sensor, and a carbon monoxide sensor;

the motion sensor is adapted to detect motion inside of a passenger compartment of a vehicle;

the heat sensor is adapted to detect temperature inside of said passenger compartment of said vehicle;

the carbon monoxide detector is adapted to detect carbon monoxide levels inside of said passenger compartment of said vehicle;

wherein a weight sensor that is adapted to detect the presence of a driver in a vehicle driver seat;

wherein the sensor housing, the weight sensor, and a seat belt sensor are all connected to a central processing unit that is able to detect motion, temperature, carbon monoxide, and presence of a driver in order to set an alarm via a vehicle horn and/or automatically lower at least one vehicle window;

wherein the sensor housing is adapted to be secured to a ceiling surface of said vehicle;

wherein the sensor housing is further defined with a top housing surface that includes at least one mounting hole thereon so that the sensor housing is adapted to be mounted to the ceiling surface of the vehicle;

wherein the sensor housing includes a sensor housing wire that extends from the sensor housing to said central processing unit;

wherein the central processing unit is wired to the seat belt sensor via a seat belt wire; wherein the seat belt sensor is used to detect a position of the driver seat belt so as to decipher whether or not the driver seat belt is in use;

wherein the central processing unit is adjacent to the weight sensor; wherein the central processing unit is in wired connection with the weight sensor, and the sensor housing wire; wherein the central processing unit includes a window relay wire, a vehicle horn wire, a vehicle ignition kill wire, and a cellular transceiver wire.

2. The automotive carbon monoxide sensor according to claim 1 wherein the window relay wire extends from the central processing unit over to a window relay in order to automatically lower said at least one vehicle window.

3. The automotive carbon monoxide sensor according to claim 2 wherein the vehicle horn wire is adapted to connect the central processing unit to said vehicle horn.

4. The automotive carbon monoxide sensor according to claim 3 wherein the vehicle ignition kill wire is adapted to connect the central processing unit to a vehicle ignition switch; wherein the cellular transceiver wire is adapted to communicate with a cell phone via a cellular transceiver.

5. The automotive carbon monoxide sensor according to claim 4 wherein the central processing unit also includes a power wire that is adapted to connect to a vehicle battery.

6. An automotive carbon monoxide sensor comprising:

a sensor housing that includes a motion sensor, a heat sensor, and a carbon monoxide sensor;

the motion sensor is adapted to detect motion inside of a passenger compartment of a vehicle;

the heat sensor is adapted to detect temperature inside of said passenger compartment of said vehicle;

the carbon monoxide detector is adapted to detect carbon monoxide levels inside of said passenger compartment of said vehicle;

wherein a weight sensor that is adapted to detect the presence of a driver in a vehicle driver seat;

wherein the sensor housing, the weight sensor, and a seat belt sensor are all connected to a central processing unit that is able to detect motion, temperature, carbon monoxide, and presence of a driver in order to set an alarm via a vehicle horn and/or automatically lower at least one vehicle window;

wherein the sensor housing includes a sensor housing wire that extends from the sensor housing to said central processing unit;

wherein the central processing unit is wired to the seat belt sensor via a seat belt wire; wherein the seat belt sensor is used to detect a position of the driver seat belt so as to decipher whether or not the driver seat belt is in use;

wherein the sensor housing is adapted to be secured to a ceiling surface of said vehicle; wherein the sensor housing is further defined with a top housing surface that includes at least one mounting hole thereon so that the sensor housing is adapted to be mounted to the ceiling surface of the vehicle;

wherein the central processing unit is adjacent to the weight sensor; wherein the central processing unit is in wired connection with the weight sensor, and the sensor housing wire; wherein the central processing unit includes a window relay wire, a vehicle horn wire, a vehicle ignition kill wire, and a cellular transceiver wire;

wherein the window relay wire extends from the central processing unit over to a window relay in order to automatically lower said at least one vehicle window;

wherein the vehicle horn wire is adapted to connect the central processing unit to said vehicle horn.

7. The automotive carbon monoxide sensor according to claim 6 wherein the vehicle ignition kill wire is adapted to connect the central processing unit to a vehicle ignition switch; wherein the cellular transceiver wire is able to communicate with a cell phone via a cellular transceiver.

8. The automotive carbon monoxide sensor according to claim 7 wherein the central processing unit also includes a power wire that is adapted to connect to a vehicle battery.

* * * * *